R. N. McCLURE.
TIRE.
APPLICATION FILED JAN. 10, 1921.
1,436,594.
Patented Nov. 21, 1922.
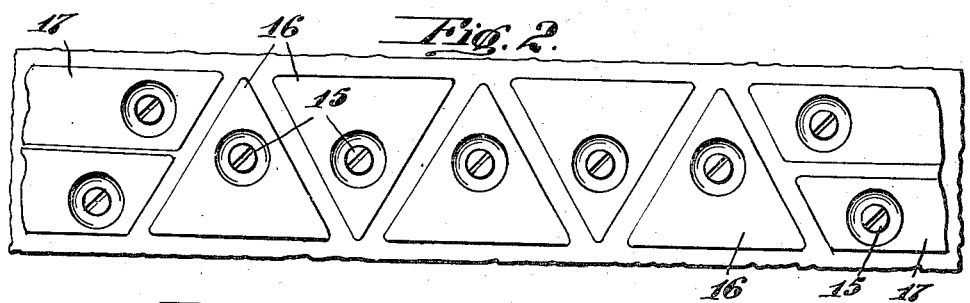
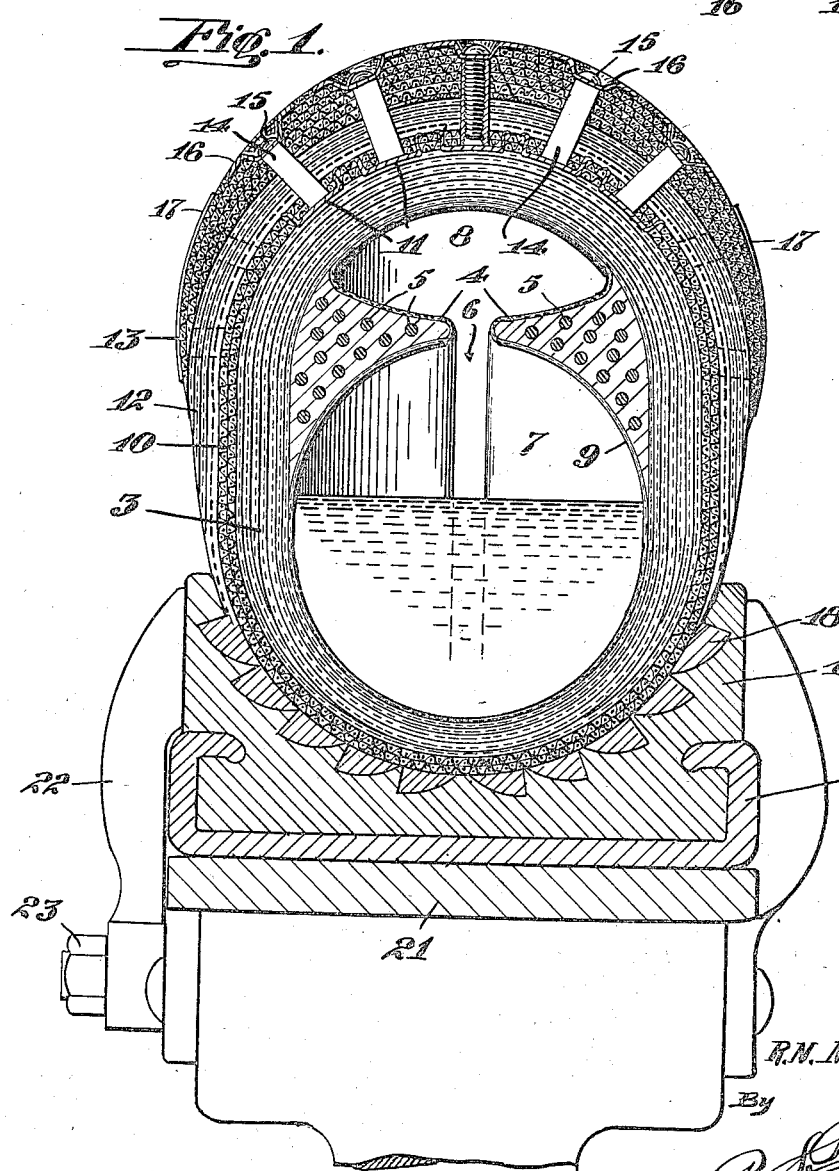

Patented Nov. 21, 1922.

1,436,594

UNITED STATES PATENT OFFICE.

RODNEY N. McCLURE, OF LOS ANGELES, CALIFORNIA.

TIRE.

Application filed January 10, 1921. Serial No. 436,143.

*To all whom it may concern:*

Be it known that I, RODNEY N. MCCLURE, a citizen of the United States, residing at Los Angeles, in the county of Los Angeles and State of California, have invented new and useful Improvements in Tires, of which the following is a specification.

This invention relates to a resilient tire for automobiles and other vehicles, and particularly pertains to a type of tire in which the sealed inner tube is of the pressure type construction and contains a resilient inflating medium consisting of a fluid having air or other fixed gases held in suspension therein in addition to a stratum of compressed air; the inner tube being protected by an outer layer of suitable fabric and further protected by removable plates secured by proper means to the layers between the outer cover to the tire.

An object of this invention is to provide a resilient inflating medium of such physical characteristics and so disposed throughout the inner tube that the lines of force of the blows to which the tire is subjected will be caused to travel circumferentially throughout the mass contained in the inner tube thereby dissipating the force of the blow.

A further object is to provide a means for inflating a tire without having the thin side walls subjected to the same high pressure as that required against the walls surrounding the greater circumference, and to provide a construction that is particularly suitable to permit the force of a blow to be transmitted to the inflating medium without said medium attempting to dissipate the blow in its own structure.

A further object is to provide means of protecting the outer layer of such a tire against usual wear, and further provides means of renewing this protection.

Other objects will appear hereinafter.

The invention is illustrated in the accompanying drawings, in which:

Figure 1 shows a tire in section on a line taken through the axis of the wheel on which the tire is mounted.

Figure 2 is a projected elevation of a part of the transverse circumference of the tire showing the location of the tread plates.

More specifically, 3 indicates an annular tubular body formed of a series of layers of rubberized fabric on the inner faces of the side walls of which tubular body is formed inwardly extending continuous ribs 4 composed of vulcanized rubber having reinforcing wires 5 embedded therein. The ribs 4 extend close to each other at their outer ends to form a restricted slot 6 and separate the interior of the tube into inner and outer chambers 7 and 8 communicating with each other through the slot 6. The inner surface of the tube is lined with a layer of rubber 9. A double layer of fabric 10 having anchor plates 11 secured thereto is wound spirally around the tubular body. Other layers of rubberized fabric 12 are provided around the double layer of fabric 10. A tread portion 13 is made up of successive layers of fabric extending partially around the tire. Internally threaded members 14 expanded into the anchor plates 11 extend radially up through the layers 12 and tread 13 and by means of screws 15 screwed therein hold cupped thread plates 16 preferably of triangular outline. Other protecting plates 17 are provided at the sides of the tire and are secured in substantially the same way as the plates 16, but their centers are disposed midway between the centers of the plates 16. A series of anchoring teeth 18 of vulcanized rubber are formed on the inner periphery of the tubular body and are embedded in the inner rim 19 of vulcanized rubber, which in turn is mounted in a metallic rim 20 adapted to be secured to a wheel rim 21 by the removable clamp 22 secured by the nut 23, as is common in demountable rim construction. To inflate the tire the inner hollow portion is partially filled with a liquid and air is forced in through a suitable valve or opening, not shown, or the fluid may be put in under pressure thereby compressing the atmospheric air ordinarily contained in the tube before filling. In either case when the tire is at rest the fluid and air will be practically separated. The inner walls of the tube whether in contact with the air or the fluid will at all points naturally be subjected to a constant pressure equivalent to the air pressure. Where the fluid is not in contact with the tube the hydrostatic pressure of the fluid will, of course, be equal to the pressure of the air in contact with the tube. When the vehicle is at rest sufficient pressure is maintained in the tire to give the proper support.

When the tire is set in motion revolving with the wheel the fluid, due to its inertia and by frictional contact with the inner walls of the tube will be strongly agitated and caused to pick up and hold in suspension some of the air, resulting in an air impregnated fluid which will be resilient, and due to the centrifugal force will tend to occupy those sections of the tire which are of greater distance from the center of the wheel. The remaining space will be occupied by the air alone.

Owing to the contour of the inner surface of the tube the mass will be deposited at the point of greater circumference of the tire and gradually diminished in depth toward the side, assuming the same contour as the inner walls of the tube. As the walls of the tire are pressed in by contact with the road the fluid will surge slightly through the peripheral opening 6 and the agitation of the fluid will cause it to pick up air.

At the points of greatest circumference the pressure against the inner walls of the tube will be greatest and gradually diminished as the depth of the mass becomes less toward the points of least circumference. At any given circumference the pressure to which the inner wall is subjected to at that point will be equivalent to the air pressure plus the hydrostatic pressure of the fluid caused by centrifugal force. Since the wear on the tire is ordinarily greatest at the point of greatest circumference the walls of all tires are generally made thicker at this point and in an inflated tire the thicker the wall the lower becomes the resiliency at that point. In this invention the centrifugal force added to the air pressure at these points gives a pressure constant with the thickness of the tire wall thereby subjecting the thicker portion of the tire to the maximum pressure required without subjecting the thinner walls of the tire to the same pressure thereby producing suitable resiliency at the point of greatest circumference to support the vehicle.

In solid rubber tires or other resilient tires a blow, such as is caused by continual forceful contact of the tire against the road or objects in the road, is always taken up by a local portion of the structure. The force travels radially from the point of contact into the mass of the substances and repeated blows at any one point will for this reason rapidly break down the molecular structure. In a tire construction of resilient material and inflated with air much of the force of the blow is taken up by the outer covering in the same way as in the solid tire and the force of a blow is dissipated largely by the structure of the tire before the force reaches the resilient and inflating medium. Also in these tires the thicker walls are subjected to the maximum bursting stresses whereas this invention permits of obtaining the desired pressure against the outer walls coming in contact with the road without subjecting the thinner walls to the same pressure. Obviously, when the vehicle is at rest the pressure need only be sufficient to support the vehicle and prevent it bearing upon the fabric of the tire.

The fabric construction, as shown is particularly adapted to carry out the purpose of the invention in as much as such a construction of walls of a pliable material readily transmits the force of a blow to the inflating means without attempting to absorb the shock in its own structure. In fact a tire wall of the requisite tensile strength but which is pliable is more advantageous in combination with means for inflating which I have described that is a substance such as rubber which is resilient but less pliable, it being obvious that the resiliency of the tire should be offered by the action of a resilient inflating medium upon its structure rather than the structure itself being resilient. This method of creating within the inner tube, a pressure which increases toward the outer circumference is particularly adapted therefore to all tires of the usual construction and may be used in a tire of any substance particularly where the thickness of the wall increases toward the point of greatest circumference; without departing from the spirit of the invention.

When a blow is struck against the walls of this tire, the fluid being in proximity to the walls receive the force of the blow. Ordinarily the lines of force of a blow against a tire tend to move toward the back of a tire along the line of its axis. With this construction, however, the centrifugal force combined with the inertia of the fluid tends to prevent the force from materially changing the circumferential contour of the mass, these lines of force being turned and caused to travel circumferentially around the tire through the center of this mass, thus the force is gradually dissipated throughout the entire length of the mass, the air which is in suspension therein undergoing a combined compression sufficient to absorb the force of the blow, but owing to the distance of the circumference the compression of the air impregnated mass at any one point is practically negligible. The specific heat of such a mass is several times greater than the specific heat of air and, therefore, the mass will not change its temperature as readily under operating conditions.

I claim:

1. In a vehicle tire, a hollow portion adapted to contain both air and fluid, and projecting members circling the inner walls of said hollow portion adapted to offer resistance to the movement of the fluid.

2. A vehicle tire comprising an annular tubular member adapted to contain both air and liquid, said tubular member being formed with inner and outer chambers communicating with each other through a restricted slot.

3. In a vehicle tire an annular tubular member formed with inwardly extending continuous ribs on the side walls thereof, the rib on one side of the tube terminating adjacent the rib on the other side of the tube to form a restricted slot between said ribs.

4. In a tire an annular tubular member adapted to contain both air and liquid, and means arranged between the inner and outer peripheries of the tube for resisting movement of the liquid.

RODNEY N. McCLURE.